United States Patent
Eom (10) Patent No.: US 10,681,903 B2
(45) Date of Patent: *Jun. 16, 2020

(54) INSECT TRAP

(71) Applicant: Seoul Viosys Co., Ltd., Ansan-si (KR)

(72) Inventor: Hoon Sik Eom, Ansan-si (KR)

(73) Assignee: Seoul Viosys Co., Ltd., Ansan-si (KR)

(*) Notice: Subject to any disclaimer, the term of this patent is extended or adjusted under 35 U.S.C. 154(b) by 461 days.

This patent is subject to a terminal disclaimer.

(21) Appl. No.: 15/158,082

(22) Filed: May 18, 2016

(65) Prior Publication Data

US 2017/0258068 A1 Sep. 14, 2017

(30) Foreign Application Priority Data

Mar. 14, 2016 (KR) .................. 10-2016-0030419
Mar. 23, 2016 (KR) .................. 10-2016-0034917

(51) Int. Cl.
*A01M 1/08* (2006.01)
(52) U.S. Cl.
CPC ..................... *A01M 1/08* (2013.01)
(58) Field of Classification Search
CPC ........................................... A01M 1/08
See application file for complete search history.

(56) References Cited

U.S. PATENT DOCUMENTS

| 2,931,127 | A | * | 4/1960 | Mayo | ........... | A01M 1/08 43/113 |
| 4,788,789 | A | * | 12/1988 | Boobar | ........... | A01M 1/08 43/113 |
| 5,157,865 | A | * | 10/1992 | Chang | ........... | A01M 1/08 43/113 |
| 2005/0060926 | A1 | * | 3/2005 | Lee | ........... | A01M 1/08 43/113 |

(Continued)

FOREIGN PATENT DOCUMENTS

| KR | 20-0393447 | 8/2005 |
| KR | 10-0632277 | 10/2006 |

(Continued)

OTHER PUBLICATIONS

Final Office Action dated Jan. 22, 2018, in Design U.S. Appl. No. 29/565,444.

(Continued)

*Primary Examiner* — Jessica B Wong
(74) *Attorney, Agent, or Firm* — H.C. Park & Associates, PLC (57) ABSTRACT

An insect trap device for attracting mosquitoes includes a main body including an upper inlet and a lower outlet, a suction fan disposed in the main body and configured to draw air from the upper inlet to the lower outlet, an insect filter disposed upstream of the suction fan, the insect filter including a plurality of openings, an upper body disposed in a spaced relationship with the upper inlet, an ultraviolet (Continued)

(UV) light source disposed between the upper inlet and the upper body, an air collector disposed downstream of the suction fan, and an insect collector disposed on the lower outlet under the air collector, in which the air collector has a substantially conical shape including a central opening at a distal apex and a plurality of side openings including mesh.

20 Claims, 5 Drawing Sheets

(56) References Cited

U.S. PATENT DOCUMENTS

| | | | | |
|---|---|---|---|---|
| 2006/0218851 | A1* | 10/2006 | Weiss | A01M 1/023 43/113 |
| 2009/0293341 | A1* | 12/2009 | Fleming | A01M 1/04 43/113 |
| 2012/0171945 | A1* | 7/2012 | Lee | A01M 1/023 454/237 |
| 2014/0165452 | A1* | 6/2014 | Rocha | A01M 1/08 43/113 |

FOREIGN PATENT DOCUMENTS

| | | |
|---|---|---|
| KR | 10-2009-0009373 | 1/2009 |
| KR | 2013-0049475 | 5/2013 |
| KR | 10-1283662 | 7/2013 |
| KR | 10-1349733 | 1/2014 |
| KR | 2014-0010493 | 1/2014 |
| KR | 10-2015-0112755 | 10/2015 |
| KR | 10-2015-0124766 | 11/2015 |
| KR | 10-2015-0125271 | 11/2015 |

OTHER PUBLICATIONS

Non-Final Office Action dated Apr. 12, 2017, in Design U.S. Appl. No. 29/565,444.

Brazilian Pre-Examination Office Action dated Sep. 17, 2019, issued in Brazilian Patent Application No. 1120160221311 (translation by Google).

* cited by examiner

INSECT TRAP

CROSS-REFERENCE TO RELATED APPLICATIONS

This patent document claims priority to and the benefit of Korean Patent Application No. 10-2016-0030419, filed on Mar. 14, 2016, and Korean Patent Application No. 10-2016-0034917, filed on Mar. 23, 2016, the entire disclosures of which are incorporated by reference in their entirety.

BACKGROUND

Field

Exemplary embodiments relate to an insect trap, and more particularly, to an insect trap that attracts insects by decoy light and collects insects by suctioning the insects using an air stream generated by a suction fan.

Discussion of the Background

Insects that may be potentially harmful to humans have been recently increased in number, due to change of climate conditions such as global warming and social policies. Harmful insects not only damage crops and livestock, but also negatively impact people by transmitting pathogenic bacteria, such as malaria, dengue, Japanese encephalitis, and the like. Particularly, studies on a mosquito insecticide method have been actively conducted due to fears related to the spread of zika virus (ZIKV).

Conventional insecticidal methods may include a chemical pest control methods using an insecticide, a biological pest control methods using mudfish and the like, a physical pest control methods using a blacklight traps and/or carbon dioxide that attracts and kills the harmful insects by applying a high voltage, and an environmental pest control method such as removal of puddles or other environment conditions favorable to insect larvae. However, chemical pest control methods may cause secondary contamination, and biological pest control methods or environmental pest control methods may be expensive, time consuming, and labor intensive. In addition, conventional physical pest control methods using an insecticide or insect trap may cause user inconvenience due to complicated configurations of the insect trap or endanger users from usage of the high voltage.

A UV light source may be used for various purposes, such as medical purposes including sterilization and disinfection, analysis purposes based on variation in intensity upon irradiation of UV light, industrial purposes such as UV curing, beauty treatment such as UV tanning, insect collection, identification of counterfeit notes, and the like. Typical UV lamps utilizing the UV light source include, for example, a mercury lamp, an excimer lamp, a deuterium lamp, and the like. However, typical UV lamps may have high power consumption, high heat generation, short lifespan, and environmental pollution due to toxic gas supplied to the lamps.

In order to address the problems of typical UV light sources, a UV light emitting device (LED) has found favor due to various merits including low power consumption and its eco-friendly characteristics. Accordingly, studies on development of an insect trap that collects insects using a suction fan after attracting the insects using decoy light have been made.

However, conventional insect traps that collect insects using the suction fan after attracting the insects by utilizing a typical UV LED have problems, such as: (i) noise generated by a suction fan due to fouling of dead insects, such as mosquitoes, on the suction fan, (ii) escape of mosquitoes from the insect trap, (iii) insufficient suctioning of mosquitoes into the insect trap due to difficulty in controlling the speed of the suction fan, and (iv) low suction efficiency or high power consumption due to difficulty in controlling air stream generated by the insect trap.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide an eco-friendly insect trap that provides more convenient manufacturing process and increased efficiency in attracting and suctioning insects.

Exemplary embodiments also provide an insect trap that may generate a suitable airflow velocity for suctioning mosquitoes while minimizing noise.

Exemplary embodiments further provide an insect trap including a UV LED module having high efficiency in attracting mosquitoes and emitting light having wavelengths and intensity that are harmless to humans.

Additional aspects will be set forth in the detailed description which follows, and, in part, will be apparent from the disclosure, or may be learned by practice of the inventive concept.

An exemplary embodiment discloses an insect trap device for attracting mosquitoes, including a main body including an upper inlet and a lower outlet, a suction fan disposed in the main body and configured to draw air from the upper inlet to the lower outlet, an insect filter disposed upstream of the suction fan, the insect filter including a plurality of openings, an upper body disposed in a spaced relationship with the upper inlet, an ultraviolet (UV) light source disposed between the upper inlet and the upper body, an air collector disposed downstream of the suction fan, and an insect collector disposed on the lower outlet under the air collector, in which the air collector has a substantially conical shape including a central opening at a distal apex and a plurality of side openings including mesh.

An exemplary embodiment also discloses an ultraviolet (UV) light emitting diode (LED) module for attracting mosquitoes, including a printed circuit board (PCB), and UV LEDs disposed on a first side of the PCB, in which the UV LEDs are configured to emit light in a wavelength range of about 340 mm to about 390 mm, and the UV LEDs is configured to emit light output in a range of 800 mW to 2,000 mW for an input voltage of 12V and an input current in a range of 75 mA to 85 mA.

An exemplary embodiment further discloses a method of selectively trapping mosquitoes including emitting light in a wavelength range of about 340 mm to about 390 mm from an ultraviolet (UV) light source of an insect trap device, and generating an airflow by rotating a suction fan enclosed in a main body of the insect trap device, in which the airflow passes through a gap in a range of about 2 cm to about 5 cm formed between the UV light source and the main body, a velocity of the airflow between the UV light source and the main body is in a range of about 0.5 m/s to about 3 m/s, and the airflow passes through a central hole of a conical air collector disposed downstream of the suction fan and into an insect collector.

The foregoing general description and the following detailed description are exemplary and explanatory and are intended to provide further explanation of the claimed subject matter.

BRIEF DESCRIPTION OF DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. As such, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
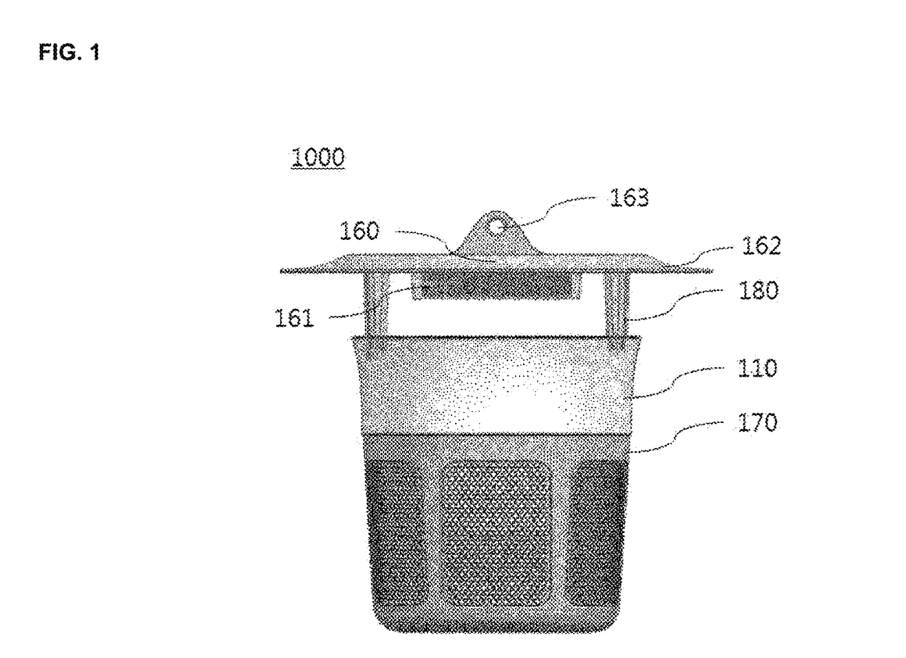
FIG. 1 is a side view of an insect trap according to an exemplary embodiment.
Figure 2:
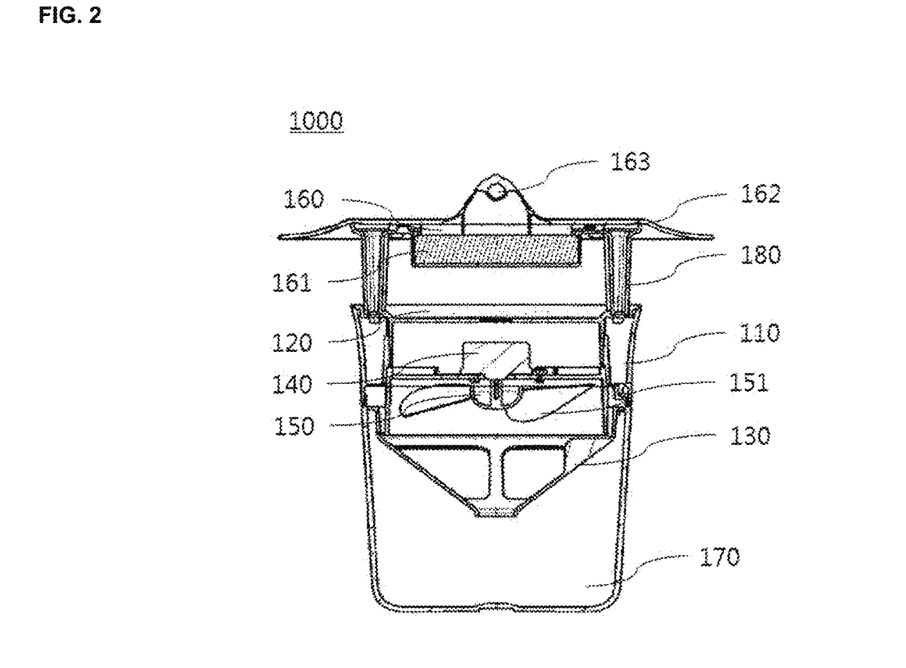
FIG. 2 is a side-sectional view of the insect trap according an exemplary embodiment.
Figure 3:
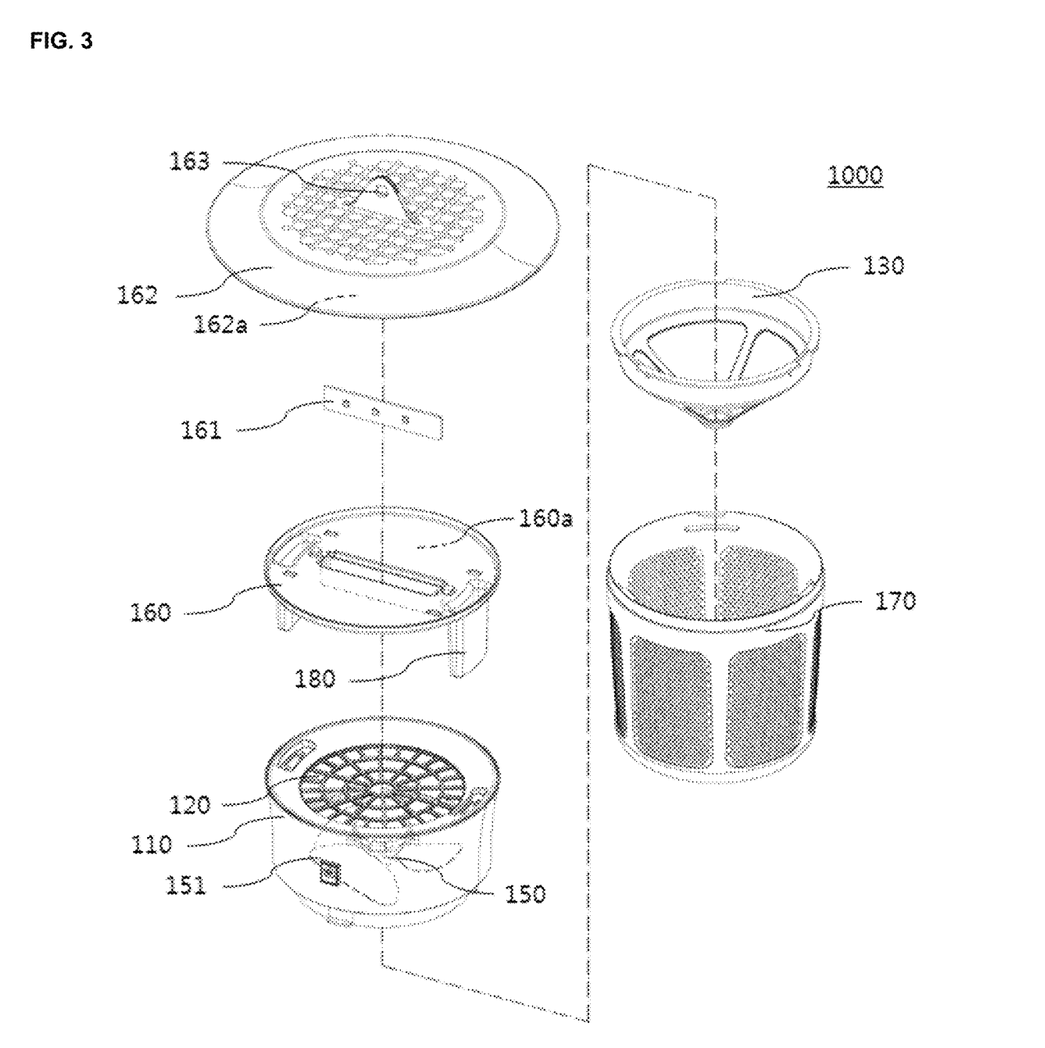
FIG. 3 is an exploded perspective view of an insect trap according an exemplary embodiment.

FIG. 1 is a side view of an insect trap according to an exemplary embodiment, FIG. 2 is a side-sectional view of the insect trap according to an exemplary embodiment, and FIG. 3 is an exploded perspective view of the insect trap according to an exemplary embodiment.

Referring to FIGS. 1 to 3, an insect trap 1000 according to an exemplary embodiment will be described in detail.

In order to collect insects after attracting the insects using UV light, the insect trap 1000 according to an exemplary embodiment includes a main body 110, an insect filter 120 detachably coupled to an upper side of the main body 110 and selectively allowing insects to pass therethrough, an air collector 130 disposed at a lower side of the main body 110, a motor 140 disposed between the air collector 130 and the insect filter 120, a suction fan 150 disposed between the motor 140 and the air collector 130 and rotated by the motor 140, a UV LED installation unit 160 disposed above the insect filter 120 and disposed with a UV LED module 161, and an insect collector 170 detachably coupled to a lower side of the main body 110 below the air collector 130 for collecting insects.

As used herein, insects are not limited to a particular kind of insect and may refer to various kinds of winged insects, particularly, mosquitoes.

The main body 110 may have a cylindrical shape and includes the suction fan 150 therein. The main body 110 may be formed of a commercially available plastic material, so as to allow indoor or outdoor use of the insect trap 1000 for a long period of time without significant increase in manufacturing costs. The main body 110, however, is not limited to a particular shape and material. The main body 110 has openings at upper side (an upper inlet) and lower side (a lower outlet) thereof to allow an air stream to pass through the upper inlet and the lower outlet. A height of the main body 110 may be in a range of 2 cm to 20 cm, preferably 3 cm to 10 cm.

Referring to FIGS. 2 and 3, the insect filter 120, the motor 140, and the suction fan 150 are disposed inside the main body 110 from the upper side of the main body 110 to the lower side thereof.

Figure 4:
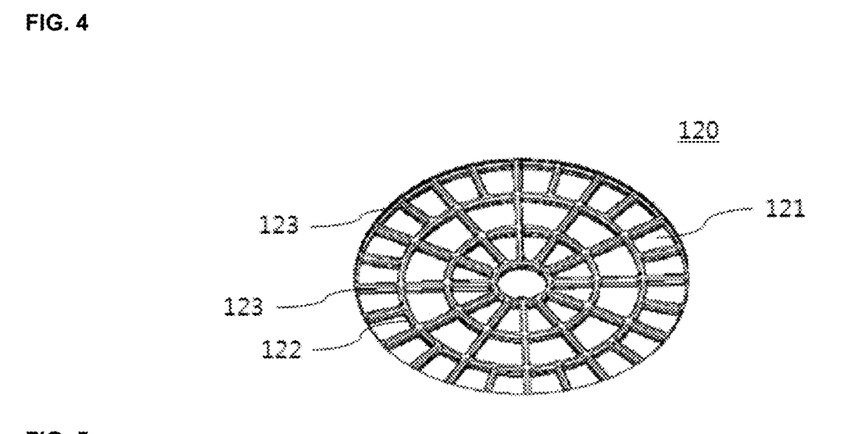
FIG. 4 is a perspective view of an insect filter of the insect trap according to an exemplary embodiment.

FIG. 4 is a perspective view of the insect filter 120 of the insect trap according to an exemplary embodiment.

Referring to FIG. 4, the insect filter 120 has a lattice shape and includes a plurality of openings 121 for selectively allowing insects to pass therethrough. The plurality of openings 121 may be defined by circular members 122 and radial members 123. More particularly, the size of the openings 121 may be adjusted by considering an average size of insects to be collected. When the insect filter 120 has a lattice shape, as shown in FIG. 4, the size of the openings 121 may be controlled with low manufacturing costs.

A conventional insect trap that collects insects using a suction fan may have problems of a short replacement cycle of the insect collector due to collection of various insects, such as butterflies, dragonflies, and flies, which are generally larger in size than mosquitoes, which may cause negative influence on the ecosystem due to collection of beneficial insects as well as harmful insects. Moreover, the conventional insect trap may have problems such as a decreased lifespan of the motor and increased noise generated by the suction fan due to fouling of large insects on the suction fan. According to an exemplary embodiment, the insect trap 1000 may control the size of the openings 121 of the insect filter 120, such that the insect trap 1000 may selectively trap insects of desired size and include an economically feasible insect filter 120.

The openings 121 are separated from one another by circular members 122 and radial members 123 arranged around the center opening of the insect filter 120. The openings 121 may have an arc shape, having a central angle of 20° to 40°. Each of the circular members 122 may be spaced apart from another adjacent circular member 123 at a distance of 1.0 cm to 1.5 cm. In this manner, each of the openings 121 may have an area of 100 $mm^2$ to 225 $mm^2$. Accordingly, the openings 121 may allow selective passage of insects, particularly, mosquitoes, therethrough, while preventing passage of larger insects, such as butterflies, dragonflies, flies, and the like into the insect trap 1000. As such, durability of the motor 140 may be increased while suppressing the noise generated from the suction fan 150.

The suction fan 150 may be controlled such that insects are suctioned through a lower portion of the suction fan 150, rather than being attached to the suction fan 150. In a conventional insect trap that collects insects using a typical suction fan, the insects may become attached to fan blades, which may adversely affect the rotational balance of the suction fan, thereby causing deterioration in durability of the motor and increased noise. When rotational speed of the suction fan is reduced in order to prevent insects from being attached to the fan blades, however, there is a significant reduction in collection efficiency with respect to insects adjacent the insect trap. More particularly, since insects generally tend to stop flying at a wind velocity of 0.8 m/s or more, and try to escape from an air stream at an excessively high wind velocity, the insect trap 1000 according to an exemplary embodiment seeks to prevent insects from being attached to the fan blades 151 while still causing mosquitoes to stop flying and be collected therein through a suction air stream generated by the suction fan 150.

To this end, the number of fan blades 151 may be two to six, preferably three or four, and the suction fan 150 may have a rotational speed of 1500 rpm to 2800 rpm, preferably 1800 rpm to 2800 rpm. If the number of fan blades 151 is less than two or the rotational speed of the suction fan 150 is less than 1500 rpm, a mosquito collection efficiency may be low, and if the number of fan blades 151 exceeds six or the rotational speed of the suction fan 150 exceeds 2800 rpm, excessive fouling of dead bodies of mosquitoes on the suction fan 150 may occur or the noise generated may be above 38 dB.

The fan blades 151 may have a rounded shape having a constant or variable radius of curvature, rather than having a flat shape, and may have a height of 5 mm to 30 mm from a lowermost end to an uppermost end thereof. The suction fan 150 may have a diameter of 60 mm to 120 mm, preferably 80 mm to 110 mm. In an exemplary embodiment, a minimum distance between the suction fan 150 and an inner wall of the main body 110 may in a range of 1 mm to 5 mm, in order to minimize noise generated by the suction fan 150 while effectively generating a suction air stream.

A ratio of vertical distance from the main body 110 to the UV LED installation unit 160 to height of the main body 110 may range from 1:1 to 1:2, and a ratio of vertical distance from the insect collector 170 to the UV LED installation unit 160 to height of the insect collector 170 may range from 1:0.5 to 1:2. In this manner, the insect trap 1000 may easily suction insects adjacent the insect trap 1000 while preventing the insects from being attached to the suction fan 150.

Accordingly, the suction fan 150 may generate an air stream having a velocity in a range of 0.5 m/s to 2.5 m/s, preferably 0.6 m/s to 2.5 m/s, more preferably 0.7 m/s to 2.5 m/s, between the insect filter 120 and the UV LED installation unit 160. For example, an air stream velocity of 0.7 m/s to 2.0 m/s may cause insects to stop flying and be collected with high efficiency into the insect collector 170 without fouling of the insects on the suction fan 150, while also suppressing noise generated by the suction fan 150.

When the motor 140 is disposed below the insect filter 120, and the suction fan 150 is provided to a lower side of the motor 140, the insect trap 1000 may reduce noise generated by the motor 140 and the suction fan 150.

Figure 5:
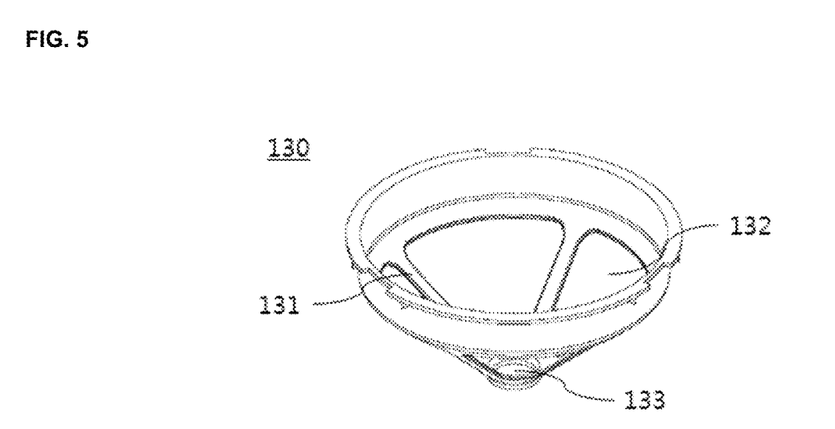
FIG. 5 is a perspective view of an air collector of the insect trap according to an exemplary embodiment.
Figure 10:
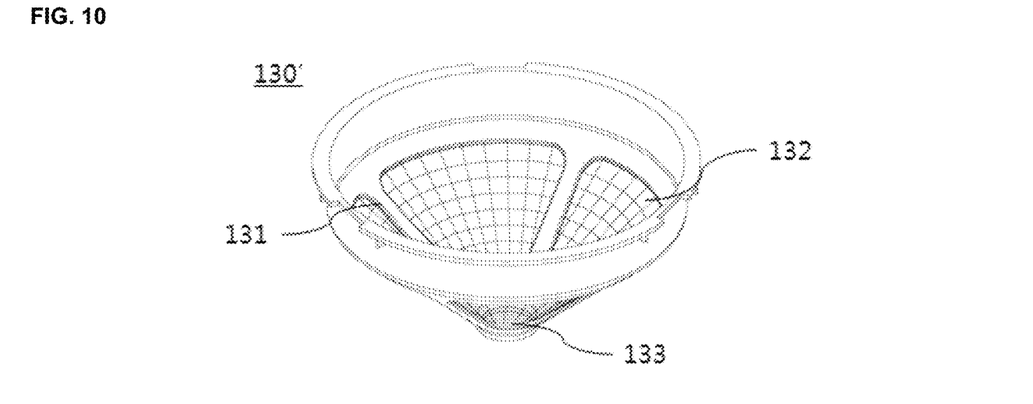
FIG. 10 is a perspective view of an air collector to an exemplary embodiment.

FIG. 5 and FIG. 10 are views of an air collector according to exemplary embodiments.

The air collector 130 or 130' is provided to the lower side of the main body 110, and may include air collection unit ribs 131, air collector side openings 132, and an air exhaust port 133 such that insects suctioned by the suction fan 150 may be discharged to the insect collector 170. The air collector 130 has a conical shape, the diameter of which gradually decreases away from the suction fan 150. The air collector 130 preferably has a conical shape, such that an air stream generated by the suction fan 150 may effectively flow to the insect collector 170 disposed at a lower side of the insect trap 1000 without dispersing the air stream. The air collector 130 includes the air collector side openings 132 to allow the air stream generated by the suction fan 150 to effectively escape from the insect trap 1000. The air collector side openings 132 are not limited to a particular shape and may have a mesh shape, as shown in FIG. 10, and the area of the side openings formed in the mesh shape may be controlled to prevent insects, particularly, mosquitoes, from passing therethrough.

Accordingly, the insect trap 1000 according to an exemplary embodiment may be configured to collect insects in the insect collector 170. When insects are suctioned into the insect trap 1000 by the suction fan 150, the insects are prevented from escaping from the insect trap 1000 through the air collector 130 by the insect collector 170.

A ratio of diameter of the air exhaust port 133 to diameter of the suction fan 150 may range from 1:2 to 1:9, preferably 1:3 to 1:5. In this manner, airflow velocity generated by the suction fan 150 may be easily controlled by the insect trap 1000.

Figure 6:
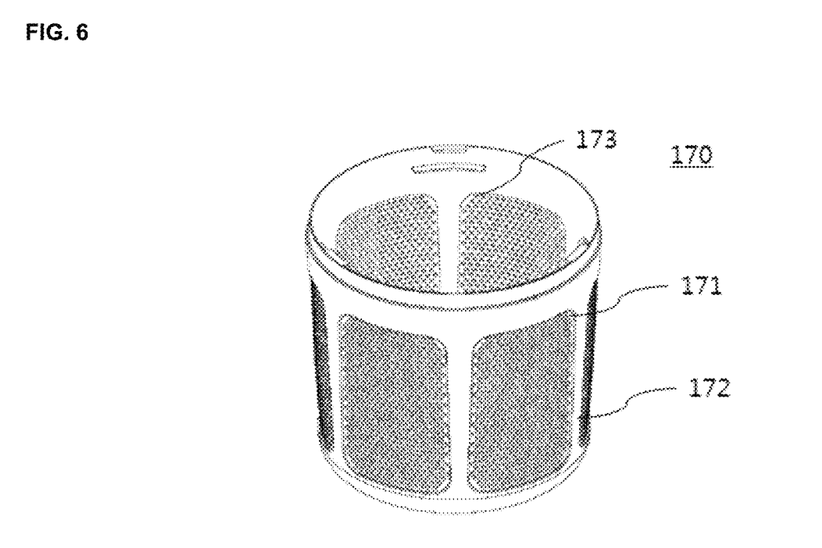
FIG. 6 is a perspective view of an insect collector of the insect trap according to an exemplary embodiment.
Figure 11:
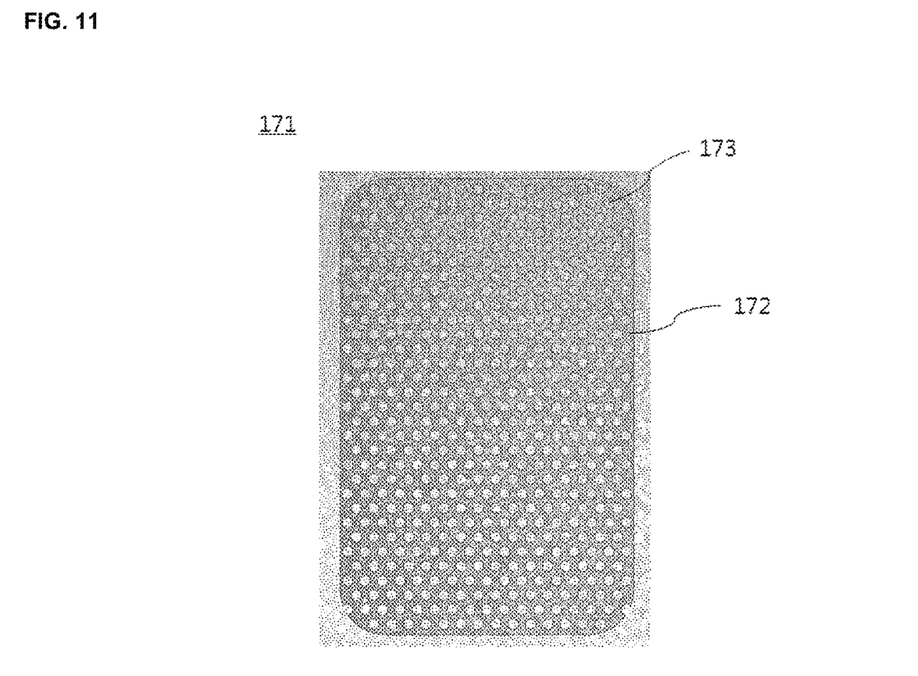
FIG. 11 is a view of a mesh of the insect trap according an exemplary embodiment.

FIG. 6 is a perspective view of an insect collector 170 of the insect trap 1000 according to an exemplary embodiment, and FIG. 11 is a view of a mesh 171 of the insect trap 1000 according to an exemplary embodiment.

Referring to FIGS. 6 and 11, the insect collector 170 may include at least one mesh 171 through which air is discharged to the outside by the suction fan 150. The mesh 171 may include mesh ribs 172 and mesh openings 173 formed between the mesh ribs 172, such that an air stream generated by the suction fan 150 is discharged from the insect collector 170 through the mesh openings 173. The mesh opening 173 may have a diameter of 1 mm to 3 mm to provide a smooth air flow while preventing the collected insects from escaping therethrough. In this manner, the collected insects may be effectively prevented from escaping back through the air collector 170 by the mesh 171, even when the suction fan 150 does not rotate or rotates in a low rpm.

More particularly, the insect collector 170 may include one to ten mesh 171, for example, three to eight mesh 171, and each of the mesh 171 may include 300 to 700 mesh openings 173 therein, preferably 400 to 600 mesh openings 173.

A ratio of total area of the openings 121 to total area of the mesh openings 173 may range from 1:0.8 to 1:3.0, preferably from 1:0.8 to 1:2.0. In this manner, insects collected in the insect collector 170 may not obstruct an air stream discharged from the insect trap 1000, even when the insects collected in the insect collector 170 occupy half the volume of the insect collector 170.

More particularly, the insect collector 170 allows an air stream generated by the suction fan 150 to be effectively discharged from the insect trap 1000, whereby mosquitoes collected in the insect collector 170 are dried and killed.

Referring back to FIGS. 1 to 3, the UV LED installation unit 160 may have a plate shape. More particularly, the UV LED installation unit 160 may be formed in a similar shape and/or size to the shape and size of the main body 110. For example, when the main body 110 has a circular shape, the UV LED installation unit 160 may have a disk shape having a similar size to the size of the main body 110.

In this manner, the UV LED installation unit 160 may restrict flow of an air stream generated by the suction fan 150 into a space defined between the UV LED installation unit 160 and the main body 110, thereby improving efficiency of generating a suction air stream into the insect trap 1000. Accordingly, the suction fan 150 may not require a high rpm, thereby reducing noise generated from the suction fan 150.

In exemplary embodiments, the insect trap 1000 may further include a buttress 180 configured to support the UV LED installation unit 160 above the main body 110 while separating the UV LED installation unit 160 from the main body 110, so as to allow insects to be suctioned into the space between the main body 110 and the UV LED installation unit 160. The UV LED installation unit 160 may include a UV LED module 161 and may further include a UV LED installation unit cap 162.

Although the shape and number of buttresses 180 are not particularly limited, two buttresses 180 may be disposed to face each other to reduce blocking of an insect introduction area while stably supporting the UV LED installation unit 160.

The height of the buttress 180 may be adjusted, such that the UV LED installation unit 160 is separated at about 1 cm to 10 cm, preferably 3 cm to 5 cm, from the main body 110 in a vertical direction. More particularly, the height of the buttress 180 may be the same as the separated distance between the UV LED installation unit 160 and the main body 110. If the separated distance between the UV LED installation unit 160 and the main body 110 in the vertical direction is less than 3 cm, the space defined between the UV LED installation unit 160 and the main body 110, into which insects are suctioned, may become too small, which may deteriorate insect collection efficiency. If the separated distance therebetween is greater than 5 cm, the air stream generated by the suction fan 150 may not have sufficient intensity, which may deteriorate insect collection efficiency.

Accordingly, when insects are attracted by UV light and approach the insect trap 1000, the insects are suctioned into the space between the main body 110 and the UV LED installation unit 160 by the suction air stream generated by the suction fan 150. The insects pass through the insect filter 120 and the suction fan 150, and are collected by the insect collector 170 disposed under the air collector 130.

Referring to FIG. 3, the UV LED module 161 may be mounted on a lower surface of the UV LED installation unit 160. More particularly, as shown in FIG. 3, the UV LED installation unit cap 162 detachably mounted on an upper side of the UV LED installation unit 160 is detached from the UV LED installation unit 160, and the UV LED module 161 is mounted on the UV LED installation unit 160 by inserting the UV LED module 161 into the UV LED installation unit 160 from an upper side to a lower side of the UV LED installation unit 160. The UV LED module 161 mounted on the UV LED installation unit 160 may be electrically connected to a power source.

In the insect trap 1000 according to an exemplary embodiment, the UV LED module 161 may be mounted on the UV LED installation unit 160, such that light emitted from the UV LED module 161 travels in a horizontal direction with respect to the ground. Insects generally maneuver at a about 1.5 m from the ground for the longest period of time during flying. As such, when the insect trap 1000 is installed at about 1.5 m from the ground, insects are strongly stimulated by light emitted from the UV LED module 161 in the horizontal direction with respect to the ground, and may be effectively attracted into the insect trap 1000.

Furthermore, as shown in FIG. 3, the UV LED installation unit cap 162 is formed on an upper surface thereof with a UV LED installation unit cap holder 163 to place the insect trap 1000 in a tree branch and the like at about 1.5 m from the ground, when used outdoors.

The UV LED installation unit 160 includes a UV LED module cover (not shown) having a shape corresponding to the UV LED module 161. The UV LED module cover may be mounted on the UV LED installation unit 160 to protect the UV LED module 161 and prevent damage to the UV LED module 161 by external dust or insects. The UV LED module cover may be transparent.

The UV LED module cover may be formed in various shapes, so as to function as a lens that may spread light emitted from the UV LED module 161 or focusing the light in a predetermined direction. The UV LED module cover may include, for example, glass, quartz, and the like. The UV LED module cover may be formed of a polymer that allows easier treatment and exhibits better moldability and higher durability than glass and quartz. In a molecular structure of the polymer, an electron cloud having a resonance frequency corresponding to UV light may be placed around an atomic nucleus in a molecular structure. The electron cloud may absorb light having a wavelength of 400 nm or less (in the UV wavelength band), thereby deteriorating light transmittance, and the polymer itself may be degraded by UV light. Accordingly, polymer is generally not used as a material for the UV LED module cover.

However, since polymethyl methacrylate (PMMA) having a monomer ratio of about 80% or more and mainly formed of carbon and hydrogen has a thin electron cloud to provide high UV transmittance, the UV LED module cover may be formed of PMMA.

Alternatively, as a stable material not reacting with UV light, a fluorine-based polymer may be used as a material for the UV LED module cover. For example, since the fluorine-based polymer has lower UV transmittance than quartz or PMMA, it is desirable that the UV LED module cover be formed to have flexibility and a thin thickness. More particularly, when using the fluorine-based polymer as the material for the UV LED module cover, UV transmittance of the UV LED module cover is taken into account. Since the fluorine-based polymer has lower UV transmittance than quartz or PMMA, the UV transmittance of the UV LED module cover increases with decreasing thickness thereof. However, the UV LED module cover having a thin thickness may be easily broken due to brittleness of polymers. As such, the UV LED module cover may be formed of a flexible material in order to reduce brittleness thereof.

Although not shown, a material capable of reflecting UV light emitted from the UV LED module 161 may be attached to or coated onto a lower surface of the UV LED installation unit 160. For example, silver or aluminum may be coated onto the lower surface of the UV LED installation unit 160. The lower surface of the UV LED installation unit 160 may further include a round or irregular pattern having various shapes to scatter the light emitted from the UV LED module 161.

Referring to FIGS. 1 to 3, the UV LED installation unit cap 162 may be mounted on an upper surface of the UV LED installation unit 160, and extends beyond the UV LED installation unit 160 in the horizontal direction. The material and shape of the UV LED installation unit cap 162 may be the same as those of the UV LED installation unit 160, without being limited thereto. For example, in an exemplary embodiment in which the UV LED installation unit 160 has a circular shape, the UV LED installation unit cap 162 may have a shape coaxial with the UV LED installation unit 160 and having a larger diameter than the UV LED installation unit 160.

The UV LED installation unit cap 162 may have a diameter in a range of 3.5 cm to 7 cm greater than the UV LED installation unit 160. If the diameter of the UV LED installation unit cap 162 is greater than the UV LED installation unit 160 by a length of less than 3.5 cm, the air stream generated by the suction fan 150 may be dispersed, rather than being collected towards the side surface or the lower surface of the UV LED installation unit 160. If the diameter of the UV LED installation unit cap 162 is greater than the UV LED installation unit 160 by a length of greater than 7 cm, light emitted from the UV LED module 161 may be blocked by the UV LED installation unit cap 162. Accordingly, the UV LED installation unit 160 may have a diameter in a range of 8 cm to 20 cm, and the UV LED installation unit cap 162 may have a diameter in a range of 10 cm to 25 cm. In this manner, the diameter of the UV LED installation unit cap 162 may be greater than the diameter of the UV LED installation unit 160 by a length of 3.5 cm to 7 cm. Further, an outer periphery of the UV LED installation unit cap 162 has a linear or curved shape and may extend to be placed below the UV LED installation unit 160, specifically, by a length of about 6 mm to 10 mm, thereby effectively directing the suction air stream into the insect trap 1000.

In the insect trap 1000 according to an exemplary embodiment, in which the UV LED installation unit 160 and the UV LED installation unit cap 162 have diameters within the above ranges, the air stream generated by the suction fan has a velocity of 0.5 m/s to 3.0 m/s, preferably 0.6 m/s to 2.5 m/s, for example, 0.7 m/s to 2.0 m/s, as measured in a region extending from the UV LED installation unit cap 162 to an upper end of the main body 110 in the vertical direction. In this manner, a suitable airflow velocity causing mosquitoes to stop flying and be suctioned into the insect trap 1000 may be provided.

As described above, the UV LED installation unit 160 is separated from the insect filter 120 by a distance of 2 cm to 5 cm, and the diameter of the UV LED installation unit cap 162 is adjusted to maintain the air stream generated by the suction fan 150 without being influenced by external wind. In this manner, the insect trap 1000 may stably suction insects into the insect filter 120, by attracting the insects with UV light emitted from the UV LED module.

Figure 7:
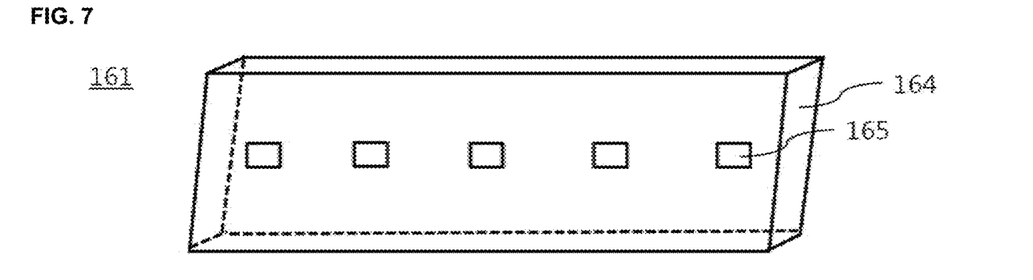
FIG. 7, FIG. 8, and FIG. 9 are views of UV LED modules according to exemplary embodiments.
Figure 8:
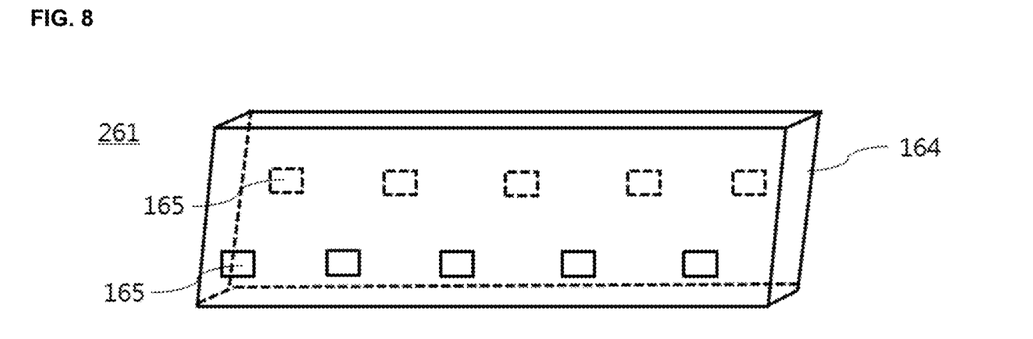
Figure 9:
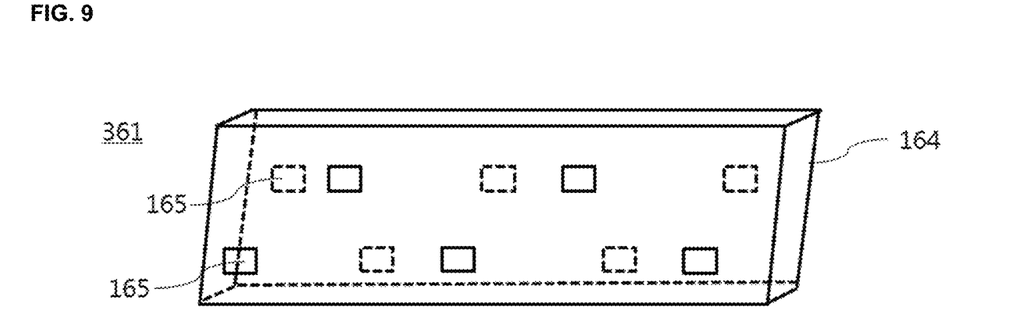

FIGS. 7 to 9 are views of UV LED modules according to exemplary embodiments.

The UV LED modules 161, 261, and 361 may emit at least one type of light selected from among UV light, visible light, and IR light, preferably UV light. With regard to a wavelength for attracting insects, it is generally known that flies and leafhoppers are attracted by light having a wavelength from about 340 nm to about 575 nm, and moths and mosquitoes are attracted by light having a wavelength of about 366 nm. In addition, other general harmful insects are relatively attracted by light having a wavelength from about 340 nm to 380 nm. Moreover, with regard to insect attracting wavelengths in the visible light range, it is generally known that insects may be attracted by utilizing lights having white, yellow, red, green, and blue light.

The UV LED modules 161, 261, and 361 emit light having a wavelength of 340 mm to 390 mm. More preferably, the UV LED modules 161, 261, and 361 may emit light having a wavelength of about 365 mm, which strongly attracts mosquitoes and is less harmful to humans.

Each of the UV LED modules 161, 261, and 361 may include one or more chip-on-board (COB) type UV LED chips 165 or one or more LED packages mounted on a support substrate 164. The UV LED chips 165 or the UV LED packages may be arranged in a plurality of rows. Alternatively, the UV LED chips 165 or the UV LED packages may be disposed in a zigzag arrangement in order to prevent the support substrate 164 from overheating.

The support substrate 164 may have a panel shape having a predetermined thickness, and include a printed circuit board (PCB) having an integrated circuit or interconnection lines therein. For example, the support substrate 164 may be a PCB having a circuit pattern printed in a region on which the UV LED chip 165 is to be mounted, and may include a material, such as a metal, a semiconductor, a ceramic, a polymer, and the like.

More particularly, each of the UV LED modules 161, 261, and 361 may have a structure in which the UV LED chips 165 are mounted on one surface of the PCB having an elongated plate shape. UV LED chips 165 may also be mounted on both surfaces of the PCB in a non-overlapping manner so as to evenly distribute heat. In each of the UV LED modules 161, 261, and 361, the plurality of UV LED chips 165, for example, four to ten UV LED chips 165 are arranged at certain intervals on the PCB in a longitudinal direction of the PCB. Heat dissipation fins (not shown) may be provided to the other surface of the PCB to dissipate heat generated from the UV LED chips 165, and both ends of each of the UV LED modules 161, 261, and 361 may be provided with terminals that may be connected to a power source to supply power to the PCB.

Each of the UV LED modules 161, 261, and 361 may be manufactured to emit a light output of 800 mW to 2,000 mW, preferably 1,000 mW to 1,500 mW, at an input voltage of 12V and an input current of 75 mA to 85 mA. In this manner, the UV LED modules 161, 261, and 361 may effectively attract insects by emitting light having a wavelength of 365 mm that are harmless to humans while reducing power consumption.

In each of the UV LED modules 161, 261, and 361, the UV LED chips 165 or the UV LED packages may be mounted on the support substrate 164, such that the UV LED chips 165 or the UV LED packages mounted on one surface of the support substrate 164 may not overlap the UV LED chips 165 or the UV LED packages mounted on the other surface of the support substrate 164. The UV LED chips 165 or the UV LED packages may be arranged in a plurality of rows or in a zigzag arrangement, without being limited thereto. Accordingly, the insect trap 1000 according to an exemplary embodiment may reduce power consumption while enlarging an irradiation range, and improve durability of the UV LED modules 161, 261, and 361 through effective dissipation of heat generated from the UV LED chips 165.

While electric energy supplied to the UV LED modules 161, 261, and 361 is converted into light energy and heat energy, a space at a distance of 5 mm or less from the UV LED chips 165 may have a temperature of 30° C. to 60° C., by heat generated from the UV LED chips 165. Since insects, particularly, mosquitoes, are strongly attracted towards a material having a temperature of about 38° C. to 40° C., which is similar to a body temperature of mammals, the insect trap 1000 may strongly attract insects through heat generated from the UV LED modules 161, 261, and 361, in addition to attracting effects of the UV LED modules 161, 261, and 361 described above.

Accordingly, the insect trap 1000 according to an exemplary embodiment includes the UV LED modules 161, 261, or 361 configured to emit a light output of 800 mW to 2,000 mW, preferably 1,000 mW to 1,500 mW, at an input voltage of 12V and an input current of 75 mA to 85 mA. The insect trap 1000 further includes the UV LED chips 165 or the UV LED packages mounted on the support substrate 164, such that the UV LED chips 165 or the UV LED packages mounted on one surface of the support substrate 164 may not overlap the UV LED chips 165 or the UV LED packages mounted on the other surface of the support substrate. Thus, the insect trap 1000 according to an exemplary embodiment may emit light that is harmless to humans and having high insect attracting efficiency, while reducing power consumption, and further generate heat such that surroundings of the insect trap 1000 may have a temperature that has high insect attracting effects.

According to an exemplary embodiment, an insect trap 1000 may further include a photocatalyst filter (not shown). Hereinafter, the photocatalyst filter will be described in detail.

The photocatalyst filter may provide a deodorization function using UV light emitted from the UV LED module 161 as a catalyst, and generate carbon dioxide. The photocatalyst filter may be disposed at any location in the insect trap 1000, so long as the photocatalyst filter receives UV light emitted from the UV LED module 161. For example, the photocatalyst filter may be disposed on the main body 110, the insect filter 120, the air collector 130, the UV LED installation unit 160, the UV LED installation unit cap 162, and the mesh 171. Preferably, referring to FIG. 3, the photocatalyst filter may be coated on a lower surface of the UV LED installation unit 160a and/or a lower surface of the UV LED installation unit cap 162a.

The photocatalyst filter may be embedded in the insect trap 1000, rather than being provided in a protrusion structure. Specifically, in a side-embedded type in which the photocatalyst filter is embedded in a side surface of the insect trap 1000 to contact an air stream generated in the insect trap 1000, an inner space of the insect trap 1000 may be formed without obstructing suction of insects and air into the insect trap 1000.

The photocatalyst filter may be formed by depositing a photocatalyst layer on a frame. For example, the photocatalyst filter may be formed by embedding a photocatalyst layer in a porous material, such as metal foam and carbon foam, or in a ceramic material.

The photocatalyst layer may include at least one of, for example, titanium oxide ($TiO_2$), silicon oxide ($SiO_2$), tungsten oxide ($WO_3$), zinc oxide (ZnO), zirconium oxide ($ZrO_2$), tin oxide ($SnO_2$), cerium oxide ($CeO_2$), iron oxide ($FeO_3$), zinc sulfide (ZnS), cadmium sulfide (CdS), and strontium titanate ($SrTiO_3$), which may function as photocatalyst media. For example, the photocatalyst layer may be formed by coating a titanium oxide ($TiO_2$) layer, or by depositing cooking oil or a tangerine liquid onto a contact portion between the photocatalyst filter and a ceramic material.

The photocatalyst layer may generate $CO_2$, which has high efficiency in attracting mosquitoes, while providing the deodorization effect. More particularly, when the photocatalyst layer is irradiated with light emitted from the UV LED module 161 and inducing photocatalysis reaction, radicals exhibiting strong reducibility may be generated through photocatalysis reaction. Then, an organic component around the photocatalyst layer may be decomposed by the radicals to generate carbon dioxide. Carbon dioxide is generally known as a gas that attracts insects, particularly, mosquitoes. For example, light inducing photocatalysis reaction may be UV light having a wavelength band of about 200 nm to 400 nm. More particularly, since light inducing photocatalysis reaction not only generates radicals when reaching the photocatalyst layer, but also attracts insects, the wavelength of light may be determined by taking two aspects into account, that is, photocatalysis reaction and direct enticement of insects.

In exemplary embodiments, in order to enhance generation of carbon dioxide, an enticing substance, such as lactic acid, amino acid, sodium chloride, uric acid, ammonia, and/or protein decomposition substances may be provided to the photocatalyst filter. For example, as a method of providing the enticing substance, the enticing substance may be deposited onto the photocatalyst layer in the photocatalyst filter or may be periodically or aperiodically sprayed onto the photocatalyst layer, without being limited thereto. In this manner, the concentration of carbon dioxide may increase, thereby improving insect attracting efficiency.

On the other hand, organic materials in air surrounding the photocatalyst filter may be decomposed by the radicals generated by photocatalysis reaction, thereby purifying air around the insect trap 1000.

More particularly, the insect trap 1000 according to an exemplary embodiment may utilize light and heat generated from the UV LED module 161, as well as carbon dioxide as insect enticing media, thereby significantly improving efficiency in attracting insects, particularly, mosquitoes.

Next, experimental data of an insect trap according to exemplary embodiments will be described. However, it should be understood that these experimental data are provided for illustration purposes only and are not to be construed in any way as limiting the exemplary embodiments described herein.

Preparative Example 1

Referring to FIG. 3, an insect trap having a total height of 199 mm and including a main body 110 having a height of 54 mm, an insect collector 170 having a height of 110 mm, and two buttresses 180 facing each other and each having a height of 35 mm has been fabricated. The main body 110 and a UV LED installation unit 160 have a diameter of 133.5 mm, a UV LED installation unit cap 162 has a diameter of 200 mm, a maximum height difference between the UV LED installation unit 160 and a UV LED installation unit cap 162 is 8 mm, insect filter 120 has a total area of 4,882.1 $mm^2$, mesh openings 173 have a total area of 9,269.3 $mm^2$, and each of the openings 121 in the insect filter 120 is set to have an area of 100 $mm^2$ to 225 $mm^2$, such that the insect filter 120 may selectively filter insects having a larger volume than mosquitoes while allowing mosquitoes to pass therethrough.

Further, the insect trap includes a suction fan 150 having a diameter of 90 mm with three fan blades 151 each having a height of 25 mm from a lowermost end to an uppermost end thereof. A distance between the fan blades 151 and an inner wall of the main body 110 is 2 mm.

Referring to FIG. 10, the insect trap further includes air collector side openings 132 arranged in a mesh shape, an air exhaust port 133 having a circular shape and having a diameter of 16 mm, and an air collector 130 having a conical shape, the diameter of which gradually decreases away from the suction fan 150 to the insect collector 170, which are disposed between the suction fan 150 and the insect collector 170.

Furthermore, an UV LED module 161 is a double-side type PCB and includes three UV LED chips 165 disposed in a zigzag arrangement on each side of the PCB. The UV LED module 161 is configured to emit light having a wavelength of 365 mm at an input voltage of 12V and an input current of 75 mA to 85 mA.

Preparative Examples 2, 3, 4, 5, 6, and 7

Insect traps were manufactured in the same manner as in Preparative Example 1 except that the number of fan blades 151 were set to one, two, four, five, six, and seven, respectively.

Preparative Examples 8, 9, 10, 11, 12, 13, 14, and 15

Insect traps were manufactured in the same manner as in Preparative Example 1 except that the mesh openings 173 had a total area of 8365.5 $mm^2$, 7508.1 $mm^2$, 6308.9 $mm^2$, 5932.3 $mm^2$, 4882.1 $mm^2$, 4432.3 $mm^2$, 3932.3 $mm^2$, and 2932.3 $mm^2$, respectively.

Preparative Examples 16, 17, 18, 19, and 20

Insect traps were manufactured in the same manner as in Preparative Example 1 except that the minimum separation distance from the fan blades 151 and the inner wall of the main body 110 was set to 0.5 mm, 1 mm, 3 mm, 4 mm, and 5 mm, respectively.

Preparative Example 21, 22, 23, 24, and 25

Insect traps were manufactured in the same manner as in Preparative Example 1 except that two buttresses 180 were set to have a height of 20 mm, 30 mm, 40 mm, 50 mm, and 60 mm, respectively.

Experimental Data 1 (Measurement of Collection Efficiency According to Light Output)

The motor of the insect trap manufactured in Preparative Example 1 was controlled, such that the suction fan 150 rotated at 2,100 rpm and light output from the UV LED module 161 was controlled as shown in following Table 1. The insect trap was placed outdoors under conditions of a temperature of 26±1° C. and a relative humidity of 50±5% for 6 hours, followed by measuring the number of mosquitoes collected in the insect trap.

TABLE 1

| Light output (mW) | 600 | 1000 | 1500 | 2000 |
|---|---|---|---|---|
| Number of collected mosquitoes | 19 | 33 | 31 | 18 |

As shown in Table 1, the insect trap according to an exemplary embodiment has an improved mosquito collection efficiency when light output is controlled to be in a range of 1,000 mW to 1,500 mW.

Experimental Data 2 (Measurement of the Number of Dead Mosquitoes and Airflow Velocity According to Rotational Speed of Suction Fan and the Number of Fan Blades)

Each of the insect traps manufactured in Preparative Example 1 to 7 were left outdoors under conditions of a temperature of 26±1° C. and a relative humidity of 50±5% for 6 hours. The number of dead mosquitoes attached to the fan blades 151 of the suction fan 150 were counted, and results thereof are shown in Table 2. In Table 2, when the number of mosquitoes attached to the fan blades 151 was fifteen or less, the test result is indicated as "good".

TABLE 2

| Number of fan blades | Number of dead mosquitoes attached to fan blades according to RPM of suction fan | | | | | |
|---|---|---|---|---|---|---|
| | 3000 rpm | 2800 rpm | 2250 rpm | 1800 rpm | 1500 rpm | 1400 rpm |
| 7 (Prep. Example 7) | 26 | 18 | 10 (good) | 5 (good) | 1 (good) | 1 (good) |
| 6 (Prep. Example 6) | 20 | 15 (good) | 6 (good) | 3 (good) | 1 (good) | 1 (good) |
| 5 (Prep. Example 5) | 17 | 15 (good) | 4 (good) | 2 (good) | 1 (good) | 0 (good) |
| 3 (Prep. Example 1) | 10 (good) | 9 (good) | 2 (good) | 1 (good) | 0 (good) | 0 (good) |
| 2 (Prep. Example 3) | 5 (good) | 3 (good) | 1 (good) | 0 (good) | 0 (good) | 0 (good) |
| 1 (Prep. Example 2) | 2 (good) | 0 (good) | 0 (good) | 0 (good) | 0 (good) | 0 (good) |

In addition, the airflow velocity was measured at an intermediate portion between an upper end of the main body 110 and the UV LED installation unit 160 in the insect trap manufactured in Preparative Example 1 to 7 using a wind speed tester (TSI 9515, TSI Co., Ltd.), and results thereof are shown in Table 3. When the airflow velocity in the range of 0.5 m/s to 2.5 m/s, the test result is indicated as "good".

TABLE 3

| Number of fan blades | Airflow velocity according to rpm of suction fan | | | | | |
|---|---|---|---|---|---|---|
| | 3000 rpm | 2800 rpm | 2250 rpm | 1800 rpm | 1500 rpm | 1400 rpm |
| 7 (Prep. Example 7) | 1.8 m/s (good) | 1.5 m/s (good) | 1.1 m/s (good) | 0.8 m/s (good) | 0.7 m/s (good) | 0.6 m/s (good) |
| 6 (Prep. Example 6) | 1.6 m/s (good) | 1.3 m/s (good) | 1.0 m/s (good) | 0.7 m/s (good) | 0.6 m/s (good) | 0.5 m/s (good) |
| 5 (Prep. Example 5) | 1.4 m/s (good) | 1.2 m/s (good) | 0.9 m/s (good) | 0.6 m/s (good) | 0.5 m/s (good) | 0.4 m/s |
| 3 (Prep. Example 1) | 1.1 m/s (good) | 0.8 m/s (good) | 0.7 m/s (good) | 0.5 m/s (good) | 0.3 m/s | 0.3 m/s |
| 2 (Prep. Example 3) | 0.7 m/s (good) | 0.7 m/s (good) | 0.5 m/s (good) | 0.5 m/s (good) | 0.2 m/s | 0.2 m/s |
| 1 (Prep. Example 2) | 0.4 m/s | 0.4 m/s | 0.3 m/s | 0.2 m/s | 0.1 m/s | 0.1 m/s |

As shown in Tables 2 and 3, when the number of fan blades 151 of the suction fan 150 is two to six and the suction fan 150 is rotated at 1,500 rpm to 2,800 rpm, an airflow velocity of 0.5 m/s to 2.5 m/s is generated to provide high efficiency in attracting and suctioning the mosquitoes, and the number of dead mosquitoes attached to the fan blades 151 is reduced.

Experimental Data 3 (Measurement of Airflow Velocity Speed According to Ratio of Total Area of Openings of the Insect Filter to Total Area of Mesh Member Openings)

The motor of each of the insect traps manufactured in Preparative Example 1 and Preparative Example 8 to 15 was controlled such that the suction fan 150 rotated at 2,100 rpm, the airflow velocity was measured at an intermediate portion between the upper end of the main body 110 and the UV LED installation unit 160 using a wind speed tester (TSI 9515, TSI Co., Ltd.), and results thereof are shown in Table 4. When the airflow velocity was in the range of 0.5 m/s to 2.5 m/s, the test result is indicated as "good".

TABLE 4

| | Prep. Example 1 | Prep. Example 8 | Prep. Example 9 | Prep. Example 10 | Prep. Example 11 | Prep. Example 12 | Prep. Example 13 | Prep. Example 14 | Prep. Example 15 |
|---|---|---|---|---|---|---|---|---|---|
| A | 4882.1 | 4882.1 | 4882.1 | 4882.1 | 4882.1 | 4882.1 | 4882.1 | 4882.1 | 4882.1 |
| B | 9269.3 | 8365.5 | 7508.1 | 6308.9 | 5932.3 | 4882.1 | 4432.3 | 3932.3 | 2932.3 |
| C | 1.90 | 1.71 | 1.54 | 1.29 | 1.22 | 1.00 | 0.91 | 0.81 | 0.60 |
| D | 1.1 (good) | 1.1 (good) | 1.1 (good) | 1.1 (good) | 1.1 (good) | 1.0 (good) | 0.9 (good) | 0.7 (good) | 0.3 |

As used herein, A denotes a total area of openings of the insect filter (mm$^2$), B denotes a total area of mesh member openings (mm$^2$), C denotes a ratio of A to B, and D denotes an airflow velocity (m/s) measured at intermediate portion between upper end of main body and UV LED installation unit 160.

As shown in Table 4, when the ratio of the total area of the openings 121 of the insect filter 120 to the total area of the mesh openings 173 is 0.8 or more, the insect trap generates an airflow velocity of 0.5 m/s to 2.5 m/s that provides high efficiency in attracting and suctioning mosquitoes.

Experimental Data 4 (Measurement of Airflow Velocity and Noise Level According to Minimum Distance from Suction Fan to Inner Wall of Main Body)

The motor of each of the insect traps manufactured in Preparative Example 1 and Preparative Examples 16 to 20 was controlled such that the suction fan 150 rotated at 2,100 rpm, the airflow velocity was measured at an intermediate portion between the upper end of the main body 110 and the UV LED installation unit 160 using a wind speed tester (TSI 9515, TSI Co., Ltd.), and results thereof are shown in Table 5. In addition, under conditions of normal noise of 29.8 dB, a noise level was measured at a location horizontally spaced apart by 1.5 m from each of the insect traps manufactured in Preparative Example 1 and Preparative Examples 16 to 20 using a noise level tester (CENTER 320, TESTO Co., Ltd.), and results thereof are shown in Table 5. When the airflow velocity was in the range of 0.5 m/s to 2.5 m/s and the noise level is 38 dB or less, the test result is indicated as "good".

TABLE 5

| | Prep. Example 1 | Prep. Example 16 | Prep. Example 17 | Prep. Example 18 | Prep. Example 19 | Prep. Example 20 |
|---|---|---|---|---|---|---|
| E | 0.5 | 1 | 2 | 3 | 4 | 5 |
| F | 1.6 (good) | 1.4 (good) | 1.1 (good) | 1.0 (good) | 0.8 (good) | 0.7 (good) |
| G | 38.1 (good) | 35.3 (good) | 33.4 (good) | 32.7 (good) | 31.5 (good) | 30.2 (good) |

As used herein, E denotes shortest distance (mm) between suction fan and inner wall of main body, F denotes airflow velocity (m/s) measured at intermediate portion between upper end of main body 110 and UV LED installation unit 160, and G denotes a noise level (dB).

As shown in Table 5, when the minimum distance from the suction fan 150 to the inner wall of the main body 110 is in the range of 1 mm to 5 mm, the insect trap generates an airflow velocity of 0.5 m/s to 2.5 m/s that provides high efficiency in attracting and suctioning mosquitoes, and provides a noise level of 38 dB or less.

Experimental Data 5 (Measurement of Airflow Velocity and Collection Efficiency According to a Separated Distance from UV LED Installation Unit to Upper End of Main Body)

The motor of each of the insect traps manufactured in Preparative Example 1 and Preparative Examples 21 to 25 was controlled such that the suction fan 150 rotated at 2,100 rpm, the airflow velocity was measured at an intermediate portion between the upper end of the main body 110 and the UV LED installation unit 160 using a wind speed tester (TSI 9515, TSI Co., Ltd.), and results thereof are shown in Table 6. In addition, 15 hours after inputting mosquitoes to a closed space, the number of mosquitoes collected in the insect trap was measured, and results thereof are shown in Table 6. When the airflow velocity was in the range of 0.5 m/s to 2.5 m/s and collection ratio was 70% or more, the test result is indicated as "good".

TABLE 6

|   | Prep. Example 1 | Prep. Example 21 | Prep. Example 22 | Prep. Example 23 | Prep. Example 24 | Prep. Example 25 |
|---|---|---|---|---|---|---|
| H | 20 | 30 | 35 | 40 | 50 | 60 |
| I | 1.5 (good) | 1.2 (good) | 1.1 (good) | 1.0 (good) | 0.9 (good) | 0.4 |
| J | 8 | 15 | 16 | 16 | 14 | 10 |
| K | 40 | 75 (good) | 80 (good) | 80 (good) | 70 (good) | 50 |

As used herein, H denotes a height of buttress 180 (mm), I denotes airflow velocity (m/s) measured at intermediate portion between upper end of main body 110 and UV LED installation unit 160, J denotes a number of collected mosquitoes, and K denotes a collection ratio (%).

As shown in Table 6, when the distance between the upper end of the main body 110 and the UV LED installation unit 160 is in the range of 20 mm to 50 mm, the insect trap generates an airflow velocity of 0.5 m/s to 2.5 m/s that provides high efficiency in attracting and suctioning mosquitoes, and improves mosquito collection efficiency.

Experimental Data 6

The rpm of the suction fan 150 of the insect trap manufactured in Preparative Example 1 was gradually increased and controlled such that the airflow velocity measured at an intermediate portion between the upper end of the main body 110 and the UV LED installation unit 160 using a wind speed tester (TSI 9515, TSI Co., Ltd.) was in the range of 0.5 m/s to 3.0 m/s. An average number of collected mosquitoes and a noise level at each airflow velocity were measured.

To measure the average number of collected mosquitoes, the number of mosquitoes collected in the insect trap was measured five times and averaged 15 hours after inputting mosquitoes to a closed space, and the noise level was measured at a location horizontally spaced apart by 1.5 m from the insect trap using a noise level tester (CENTER 320, TESTO Co., Ltd.), and results thereof are shown in Table 7. When the airflow velocity was in the range of 0.5 m/s to 2.5 m/s, the collection ratio was 70% or more, and the noise level was 38 dB or less, the test result is indicated as "good".

TABLE 7

| L | 0.5 (good) | 0.7 (good) | 1.0 (good) | 1.5 (good) | 2.0 (good) | 3.0 |
|---|---|---|---|---|---|---|
| M | 0.5 | 14.0 | 14.0 | 14.5 | 15 | 15.5 |
| N | 2.5 | 70.0 (good) | 70.0 (good) | 72.5 (good) | 75 (good) | 77.5 (good) |
| O | 25.2 (good) | 28.5 (good) | 33.4 (good) | 35.3 (good) | 38.0 (good) | 39.0 |

As used herein, L denotes airflow velocity (m/s) measured at intermediate portion between upper end of main body 110 and UV LED installation unit 160, M denotes an average number of collected mosquitoes, N denotes a collection ratio (%), and 0 denotes a noise level (dB).

As shown in Table 7, when the airflow velocity measured at an intermediate portion between the upper end of the main body 110 and the UV LED installation unit 160 is in the range of 0.7 m/s to 2.0 m/s, the collection ratio of mosquitoes is 70% or more, which is a value indicated as being "good", and the noise level is 38 dB or less.

As described above, an insect trap according to exemplary embodiments is eco-friendly with improved insects attracting effects, for example, mosquitoes, and provide improved suctioning effects without power loss while suppressing noise generated by controlling each component of the insect trap.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. An insect trap device, comprising:
   a main body comprising an upper inlet and a lower outlet;
   a suction fan disposed in the main body and configured to draw air from the upper inlet to the lower outlet;
   an insect filter disposed upstream of the suction fan, the insect filter comprising a plurality of openings;
   a cap disposed in a spaced relationship with the upper inlet;
   an ultraviolet (UV) light source disposed between the upper inlet and the cap, wherein the UV light source is configured to emit light in a wavelength range of 340 mm to 400 mm;
   an air collector directly connected to the lower outlet of the main body downstream of the suction fan; and
   a rigid insect collector disposed on the lower outlet and extending below the air collector,
   wherein the air collector has a substantially conical shape with a diameter decreasing as distance from the lower outlet increases, the air collector comprising a central opening at a distal apex and a plurality of side openings disposed in a conical side wall of the air collector adjacent a plurality of ribs, and
   the rigid insect collector is spaced from and surrounds the conical side wall of the air collector.

2. The insect trap device of claim 1, wherein a distance between the UV light source and the upper inlet is in a range of 2 cm to 5 cm.

3. The insect trap device of claim 1, wherein the insect filter is detachably disposed on the upper inlet.

4. The insect trap device of claim 1, wherein the UV light source comprises at least one light emitting diode (LED) configured to generate heat in a range of 30° C. to 60° C. within 5 mm therefrom.

5. The insect trap device of claim 1, further comprising a photo-catalyst layer coated adjacent the UV light source and the upper inlet, the photo-catalyst layer comprising at least one of titanium, silicon, tungsten, and zirconium.

6. The insect trap device of claim 1, wherein the suction fan comprises blades configured to rotate at a range of 1500 rpm to 2800 rpm.

7. The insect trap device of claim 1, wherein the suction fan is configured to generate an airflow having a velocity in a range of 0.5 m/s to 3 m/s between the UV light source and the upper inlet.

8. The insect trap device of claim 1, further comprising:
a motor for the suction fan disposed in the main body, wherein the suction fan is disposed between the motor and the air collector.

9. The insect trap device of claim 1, wherein:
the suction fan comprises blades; and
the blades and an inner portion of the main body are spaced apart in a range from 1 mm to 2.5 mm.

10. The insect trap device of claim 1, wherein:
the cap comprises an extension portion extending substantially parallel to a plane defined by the upper inlet; and
a diameter of the extension portion is greater than a diameter of the main body in a range of 3.5 cm to 7 cm.

11. The insect trap device of claim 1, wherein a ratio of a diameter of the suction fan to a diameter of the central opening is in a range of 1:2 to 1:9.

12. The insect trap device of claim 1, wherein a surface area of each of the plurality of openings of the insect filter is in an range of 100 mm$^2$ to 225 mm$^2$.

13. The insect trap device of claim 1, wherein the plurality of side openings comprise mesh.

14. An insect trap device, comprising:
a main body comprising an upper inlet and a lower outlet;
a suction fan disposed in the main body and configured to draw air from the upper inlet to the lower outlet;
an insect filter disposed upstream of the suction fan, the insect filter comprising a plurality of openings;
a cap disposed in a spaced relationship with the upper inlet;
an ultraviolet (UV) light source disposed between the upper inlet and the cap;
an air collector directly connected to the lower outlet of the main body downstream of the suction fan; and
a rigid insect collector disposed on the lower outlet and extending below the air collector,
wherein the air collector has a substantially conical shape with a diameter decreasing as distance from the lower outlet increases, the air collector comprising a central opening at a distal apex and a plurality of side openings disposed in a side wall of the air collector adjacent a plurality of ribs, and
the rigid insect collector is spaced from and surrounds the side wall of the air collector.

15. The insect trap device of claim 14, wherein:
the UV light source is a UV light emitting diode (LED) disposed on a UV LED installation unit comprising a UV LED module,
the UV LED installation unit comprises a plate shaped support substrate, and
the UV LED module comprises one or more UV LED chips or UV LED packages mounted on a surface of the support substrate.

16. The insect trap device of claim 15, wherein the insect filter is detachably disposed on the upper inlet.

17. The insect trap device of claim 15, wherein the UV LED module is configured to emit light in a wavelength range of 340 nm to 390 nm.

18. The insect trap device of claim 15, further comprising a photo-catalyst layer disposed adjacent the UV light source and the upper inlet, the photo-catalyst layer comprising at least one of titanium, silicon, tungsten, and zirconium.

19. The insect trap device of claim 15, further comprising:
a motor for the suction fan disposed in the main body, wherein the suction fan is disposed between the motor and the air collector.

20. The insect trap device of claim 15, wherein:
the cap comprises an extension portion extending substantially parallel to a plane defined by the upper inlet.

* * * * *